US006270563B1

(12) United States Patent
Herget et al.

(10) Patent No.: US 6,270,563 B1
(45) Date of Patent: Aug. 7, 2001

(54) PIGMENT COMPOSITION

(75) Inventors: Gerhard Herget, Ober-Ramstadt; Wolfgang Hechler, Lautertal; Carsten Griessmann, Gross-Zimmern, all of (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 09/417,764

(22) Filed: Oct. 14, 1999

(30) Foreign Application Priority Data

Oct. 14, 1998 (DE) ............................................... 198 47 169

(51) Int. Cl.$^7$ ....................................................... C04B 1/32
(52) U.S. Cl. .......................... 106/415; 106/447; 106/491; 106/504; 106/501.1; 106/169.41; 106/169.56
(58) Field of Search ...................................... 106/499, 504, 106/501.1, 415, 447, 491, 169.41, 169.51, 169.56, 169.01

(56) References Cited

U.S. PATENT DOCUMENTS

| | | | | |
|---|---|---|---|---|
| 4,173,492 | * | 11/1979 | Pollard | 106/415 |
| 4,814,020 | * | 3/1989 | Kieser et al. | 106/499 |
| 5,228,912 | * | 7/1993 | Herget et al. | 106/479 |
| 5,656,375 | * | 8/1997 | Osterried et al. | 428/403 |

* cited by examiner

*Primary Examiner*—C. Melissa Koslow
*Assistant Examiner*—Veronica F. Faison
(74) *Attorney, Agent, or Firm*—Millen White Zelano & Branigan

(57) ABSTRACT

The invention relates to a non-dusting homogeneous pigment composition comprising
  at least 50 % by weight of one or more effect pigments,
  0.1–50 % by weight of plasticizer or a mixture of plasticizer/nitrocellulose, and
  0–49.9 % by weight of a solvent or solvent mixture; and
  to its use in paints, varnishes, printing inks and plastics.

20 Claims, No Drawings

PIGMENT COMPOSITION

The invention relates to a non-dusting homogeneous pigment composition, its preparation and its use in paints, varnishes, printing inks and plastics and as a precursor for printing inks.

BACKGROUND OF THE INVENTION

Pigments in industrial processes are often used not in the form of dry powders, since such powders form dust, which leads to increased requirements in terms of workplace safety. In addition, the incorporation of powders into plastics, basecoat systems, etc., is frequently observed to be accompanied by agglomeration of the pigment powder. Homogeneous distribution of the pigment in the respective matrix is, however, difficult if not impossible to achieve.

Instead of the pigment powder, non-dusting pigment preparations are used, as known from DE-C 36 27 329 and DE-A 41 39 993. These are readily dispersible pearl luster pigment preparations, in which a platelet-shaped pearl luster pigment is coated with a polymer resin with or without plasticizers, solvents and surfactants. DE-A 41 39 993 discloses pigmented free-flowing powders with a low moisture content.

Pastes and dry preparations prepared from them, as known, for example, from EP 0 803 552, are an industrial alternative to the dry or moistened powders provided that they meet the following general conditions:
  flowable consistency
  minimal dilatency
  at maximum pigment content The components of the preparation/paste should be chosen such that the preparation/paste is tailored to suit the other components of the respective coating system and, once incorporated, lends itself readily to homogeneous distribution.

In addition to good compatibility with the other components of the coating system, pigment preparations are required to exhibit high stability; that is, they must not tend towards phase separation. This requirement is particularly important in the case of pigment preparations based on platelet-shaped pigments, since owing to their structure such pigments have a tendency to undergo caking on phase separation and are difficult to reagitate. Homogeneous distribution of the pigment in the respective matrix is difficult, if not impossible, to achieve. For example, an aqueous pigment preparation obtained by forming an aqueous paste from a powder comprising platelet-shaped pearl luster pigments exhibits inadequate stability.

Coating compositions, such as varnishes, paints, printing inks, etc., comprising pigments based on platelet-shaped substrates are subject to handling problems insofar as the pigments, owing to their size and density, settle readily and may then become compacted to form an extremely solid sediment cake. This cake can generally be reagitated only with very great difficulty. This situation affects in particular the storage of varnishes, paints and printing inks and their processing.

Thus, numerous methods have been developed, inter alia, to solve the problem of the incorporation and handling of platelet-shaped pigments in coating compositions.

DE 36 27 329 and the EPs 0 306 056 and 0 268 918 disclose that modified platelet-shaped substrates with a polymer coating and, respectively, following treating with coupling reagents such as organotitanates, or organosilanes in covering compositions, exhibit improved settling and reagitation characteristics.

Furthermore, reagitation can be facilitated by treating the coating compositions with additives which bring about controlled flocculation (house of cards effect), pseudoplastic and/or thixotropic behavior, steric repulsion and/or electrostatic repulsion of the pigments.

Additives with thixotropic characteristics are described in EP 0 198 519 and DE-A 18 05 693. DE-A 39 22 178 discloses that mixing a suspension of a platelet-shaped substrate with spherical particles such as $SiO_2$, $TiO_2$ and $ZrO_2$, for example, produces deagglomerated and readily dispersible pigments.

In EP 0 523 357, pearl luster pigments are treated with diurea derivatives, while EP 0 515 928 discloses the surface modification of pigments with polyacrylates. EP 0 650 144 discloses the coating of pearl luster pigments with $SiO_2$/$Al_2O_3$ and $SiO_2$/$ZrO_2$.

The pigment preparations that are based on platelet-shaped pigments and have been developed to date for use in aqueous and organic coating systems often fail to comply to a sufficient extent with the requirements as described.

SUMMARY OF THE INVENTION

An object of the present invention was therefore to provide pigment compositions, based on platelet-shaped pigments, which
  can be used in aqueous and organic coating systems,
  exhibit high stability, and
  are characterized by a high level of compatibilty with the other components of the coating system.

It has been found that this object can be achieved by the provision of the pigment composition of the invention.

Upon further study of the specification and appended claims, further objects and advantages of this invention will become apparent to those skilled in the art.

The invention therefore provides a non-dusting homogeneous pigment composition comprising:
  at least 50% by weight of one or more effect pigments,
  0.1–50% by weight of plasticizer or a mixture of plasticizer/nitrocellulose, and
  0–49.9% by weight of a solvent or solvent mixture.

The invention also provides a process for preparing the pigment composition, characterized by the dry mixing of the effect pigments with the plasticizer or plasticizer/nitrocellulose mixture and, if used, with the solvent or solvent mixture in a mixing vessel.

Also surprising is the observation that the pigment preparation is not permanently affected in its optical properties. The concentration in which the plasticizer or plasticizer/nitrocellulose mixture is used is 0.1–50% by weight; preferably, however, it is 5–30% by weight, in particular 10–25% by weight, based on the pigment. The weight ratio of plasticizer to nitrocellulose is variable but is preferably from 1:1 to 1:9.

The pigment preparation according to the invention is also notable for its good compatibility with the other components of coating systems, and for its good processability, high level of freedom from dust, and stability. In connection with the ease of incorporation of the pigment preparation into formulations, a delayed settling behavior and an improved reagitation behavior of any sediment are observed. Furthermore, depending on the moisture content, the pigment composition is a flowable paste or a moistened free-flowing powder highly suitable for the production of dry preparations, such as pellets, granules, briquettes, etc., for example. The dry preparations produced from the pigment preparation of the invention are likewise provided by the invention.

An essential constituent of the composition is pigments. The effect pigments used are preferably interference pigments based on platelet-shaped, transparent or semitransparent substrates of, for example, sheet silicates, such as, for instance, natural or synthetic mica, talc, kaolin, or of glass or other silicatic materials, which are coated with one or more layers of at least one metal oxide or metal oxide hydrate. In such an arrangement at least one of these layers comprises preferably one or more metal oxides and/or metal oxide hydrates of high refractive index, selected from the following group: titanium dioxide, titanium suboxide, tin oxide, zirconium oxide, zirconium dioxide, zinc oxide, iron oxide ($Fe_2O_3$, $Fe_2O_4$), chromium oxide, nickel oxide, cobalt oxide and the corresponding oxide hydrates.

It is also possible to use platelet-shaped metal oxides such as, for example, platelet-shaped iron oxide, aluminum oxide, titanium dioxide, silicon dioxide, LCPs (liquid crystal polymers), holographic pigments or bismuth oxichloride in the pigment preparations of the invention.

As the platelet-shaped pigments it is also possible to use metal flakes, which can be uncoated or else covered with one or more metal oxide layers; preference is given, for example, to Al, Cr, Fe, Au, Ag and steel flakes. Where metal flakes susceptible to corrosion, such as Al, Fe or steel flakes, for example, are to be used uncoated, they are preferably covered with a protective polymer layer.

These platelet-shaped pigments are known and in a large number of cases are available commercially, and/or can be prepared by standard techniques known to the person skilled in the art. Interference pigments based on transparent or semitransparent platelet-shaped substrates (pearl luster pigments) are described. For example, in the German Patents and Patent Applications 14 67 468, 19 59 998, 20 09 566, 22 14 454, 22 15 191, 22 44 298, 23 13 331, 25 22 572, 31 37 808, 31 37 809, 31 51 343, 31 51 354, 31 51 355, 32 11 602, 32 35 017 and 38 42 330.

Particularly preferred pigment compositions comprise $TiO_2/Fe_2O_3$-coated mica platelets or $SiO_2$ platelets. The coating of the $SiO_2$ platelets can take place, for example, as described in WO 93/08237 (wet-chemical coating) or DE-A 196 14 637 (CVD process).

The pigment composition of the invention can include one or more effect pigments; in many cases it is possible to obtain special effects by using at least two different pigments. The mass fraction of the platelet-shaped pigments in the pigment preparation of the invention is not less than 50% by weight and in particular at least 60% by weight; particular preference is given to pigment compositions of the invention having a pigment content of more than 80% by weight.

As a further component, the pigment composition of the invention is required to include one or more plasticizers, which generally are high-boiling liquids of low volatility and excellent compatibility with the binder. The plasticizer consists preferably of one or more compounds selected preferably from the group consisting of the following compounds: phthalates, trimellitates, adipates, acyclic and aliphatic dicarboxylic esters, polyesters, phosphates, fatty acid esters, hydroxycarboxylic esters, and epoxide derivatives, as described, for example, in Karsten, Lackrohstofftabellen, 9th edition, 1992.

The plasticizers are preferably hydroxycarboxylic esters, such as citric esters, tartaric esters, acetyl trimethylcitrate, acetyl triethylcitrate, or esters of phthalic acid with linear, branched, or cyclic alcohols having 1 to 12 carbon atoms, esters of adipic, sebacic or azelaic acid, fatty acid esters, and other commercially customary plasticizers, which are described, for example, in Kirk-Othmer, vol. 15, pp. 720–789. Especially in the sector of the printing industry, particular preference is given to using the following plasticizers in conjunction with nitrocellulose: phthalates, phosphate esters, citrates, butyrates and epoxide derivatives.

In the mixtures with nitrocellulose (NC) it is preferred to use those NCs which have a nitrogen content of 10.9–12.3% and/or have good solubility in alcohols. The term nitrocellulose also embraces all of the nitrocellulose derivatives known to the person skilled in the art, especially those commonly used in printing inks. Further preference is given to those NCs used in the sector of gravure and/or flexographic printing (low-viscosity grades). Examples of useful nitrocelluloses include, but re not limited to, cellulose mononitrate, cellulose dinitrate and cellulose trinitrate. The degree of substitution and nitrogen content thereof affects the solubility of the nitrocellulose in organic solvents.

The weight fraction of the plasticizer or plasticizer/nitrocellulose mixture in the pigment preparation of the invention is from 0.1 to 50% by weight, preferably from 5 to 30% by weight and, in particular, from 10 to 25% by weight.

The pigment composition of the invention is prepared in a simple manner by adding the plasticizer and, if desired, the nitrocellulose, a solvent and, if desired, further additives simultaneously or in succession to the effect pigment or pigments. In this context, it has proved to be advantageous to add the plasticizer, the nitrocellulose if used, and the solvent not in one portion but instead continuously with stirring. This mixture is gently homogenized in a mixing apparatus, for example a tumble mixer, flywheel mixer, bucket mixer of fluid mixer, with preference being given to low-speed mixers owing to the relatively high fragility of the effect pigments. The mixers are not critical, but Dispermats, granulating mixers and bucket mixers are particularly suitable.

If a solvent is used, preferred solvents include ethanol, nbutanol, ethyl acetate, methyl ketone, ethyl ketone and isopropanol.

During or after the preparation of the pigment composition of the invention it is possible to add further conventional additives, examples being pH regulators, defoamers, wetting agents, antisettling agents, levelling agents, siccatives and thixotropic agents. These are auxiliaries customary in the coatings industry, which may be present in the pigment composition of the invention in an amount of from 0 to 10% by weight.

Features of the pigment compositions of the invention include good compatibility with the other components of aqueous or organic coating systems, a high level of freedom from dust, a high stability good processability and very little or no nucleation tendency and are therefore markedly superior to conventional pigment formulations.

The pigment compositions of the invention can be used for diverse applications. They are preferably used in organic coating systems from the sectors of printing, especially flexographic, gravure, offset and screen printing, and also in paints and plastics. The pigment compositions are used with particular preference to prepare dry compositions such as, for example, pellets, granules and briquettes, and especially in precursors for printing inks.

To produce the dry compositions, the pigment composition is pasted in a proportion of 100% by weight with an organic solvent or solvent mixture. The flowable pigment composition is then highly suitable for filling tubes and for extrusion.

To produce dry compositions, the pigment composition of the invention is extruded or compressed into a compact particulate form by other methods known to the person skilled in the art, such as by tabletting, briquetting, pelletizing, granulating, spray-granulating or extruding, and if desired is subsequently dried.

The said techniques are known to the person skilled in the art and are described, for example, in "Size Enlargement by Agglomeration", Wolfgang Pietsch, John Wiley & Sons, Chichester, New York, Brisbane, Toronto, Singapore 1991.

When the pigment composition or paste is pressed through a perforated plate, which is done either batchwise by means of pistons or continuously through an extruder, particles in sausage form are produced. By appropriately adjusting the viscosity of the preparation it can be ensured that the length of the particles is regulated automatically as a result of breaking off or tearing off on emergence from the perforated plate. The separation of the paste extrudates emerging from the perforated plate, to form particles, can alternatively be done by known mechanical means, for example, by means of rotating separation blades. Pelletization or granulation takes place in a known manner on pelletizing plates or in granulating vessels and generally results in spherical particles of the composition.

The preparation of pigment granules by way of plates or drums may be advantageous in certain cases in order to ensure that only a minimum of auxiliary solvent and/or water is used. The pigment compositions used as starting materials for this purpose are generally moistened powders, which in some cases may already be in granulated form, and with the further process step are merely brought into the form of the desired, defined particles.

The particles produced firstly by pressing through a perforated plate can subsequently be shaped further by pelletization or granulation. Tabletting or briquetting takes place by pressing the paste in appropriate molds.

The process of drying the particles produced by compaction takes place generally at temperatures from 20° C. to 150° C., lasts for between 0.5 and 4 h and can be carried out, if desired, under reduced pressure. Finally, the dry composition is classified or comminuted, if desired. The granules (for example) obtained in this way are likewise non-dusting and have particle sizes in the range of 0.1–80 mm, preferably 0.1–20 mm, in particular 0.1–2 mm. The storage and transportation of the dry compositions are not subject to any great restriction and are therefore highly unproblematic. The dry compositions possess the further advantage that they carry little or no liquid and therefore possess increased stability.

The dry composition can also be prepared in the absence of water and/or solvents by processing the resins and further components with the pigment at increased temperature to form a flowable or free-flowing melt and producing granules from this melt by forming drops, by centrifugation or by the use of granulating plates or drums.

The pigment granules can also be admixed with substances which assist or accelerate the breakdown and dissolution of the pigment granules, examples being bulky spherical particles, such as hollow beads, or half-beads, or substances which dissolve very rapidly in the application medium, or swell and in that way "explode" the granules.

The pigment composition and dry compositions produced from it can be incorporated into all known application media, especially varnishes, paints and printing inks.

The invention likewise provides application media comprising dry compositions produced from the pigment preparation of the invention.

The pigment preparations and dry preparations of the invention are compatible with a large number of color systems, preferably from the sector of varnishes, plastics, paints and printing inks. The invention therefore also provides for the use of the pigment composition and of the dry compositions produced from it in paints, printing inks, varnishes and plastics.

The pigment composition of the invention is therefore of considerable economic importance.

The entire disclosure of all applications, patents and publications, cited above and below, and of corresponding German Application No. 198 47 169.6, filed Oct. 14, 1998 is hereby incorporated by reference.

In the foregoing and in the following examples, all temperatures are set forth uncorrected in degrees Celsius; and, unless otherwise indicated, all parts and percentages are by weight.

EXAMPLES

Example 1

100 g of triethyl citrate (from Boehringer Ingelheim) are added with stirring to 900 g of Iriodin® 123 (TiO$_2$ mica pigment of particle size 5–20 μm from Merck KGaA, Darmstadt) and the two components are mixed homogeneously. The moist, homogeneous, non-dusting pigment composition is discharged and dispensed gastight into PE bottles.

Example 2

800 g of Iriodin® 123 are charged to a mixing granulator R02 (from Eirich), and 40 g of triethyl citrate and a solution of 200 g of nitrocellulose chips VP-N-4320 (AM330, plasticized with octyl diphenyl phosphate, from Wolf Walsrode) in 500 g of ethanol are added. The components are subsequently mixed until homogeneous. The moistened granules are granulated further in a rotating plate TR04 (from Eirich), with the addition of further ethanol if required, and are discharged continuously. The conditioned moist granules obtained are dried in a vacuum cabinet and subsequently freed from the coarse fraction by sieving. The material removed by sieving (5%) can be used again for new granulation experiments. The main fraction (95%) is tested for strength (compressive strength) and rate of dissolution in a commercially available nitrocellulose binder GS 95 MB 011TW (Gebruder Schmidt Druckfarben) having good properties. The printing ink is used to produce flexographic proofs (F1, from IGT) which show a very good luster effect and also print uniformly.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A non-dusting homogeneous pigment composition comprising:

at least 50% by weight of one or more effect pigments, 0.1–50% by weight of a plasticizer wherein the plasticizer comprises at least one hydroxycarboxylic ester or the plasticizer comprises at least one phthalate, phosphate ester, citrate, butyrate or epoxide compound and is in admixture with a nitrocellulose, and 0–49.9% by weight of a solvent or solvent mixture.

2. A pigment composition according to claim 1, wherein the effect pigment comprises a pearl luster pigment or $Al_2O_3$, $SiO_2$ or $TiO_2$ platelets coated with one or more metal oxides.

3. A pigment composition according to claim 1, wherein the plasticizer is a hydroxycarboxylic ester.

4. A pigment composition according to claim 1, which contains a mixture of a phthalate, phosphate ester, citrate, butyrate or epoxide compound plasticizer and a nitrocellulose in a weight ratio of plasticizer to nitrocellulose from 1:1 to 1:9.

5. A pigment composition according to claim 1, wherein the composition contains a solvent which solvent is an alcohol.

6. A process for producing a composition according to claim 1, which comprises simultaneously or successively adding the plasticizer, any nitrocellulose, and any solvent to the effect pigment and gently homogenizing the mixture in a powder mixer.

7. A solventborne coating system which comprises a pigment composition according to claim 1.

8. A printing ink which comprises a pigment composition according to claim 1.

9. A gravure, screen, flexographic or offset printing ink which comprises a pigment composition according to claim 1.

10. A pigment composition according to claim 1, in dried form.

11. A pigment composition according to claim 10 in the form of granules, briquettes, tablets or pellets.

12. A pigment composition according to claim 1, wherein the plasticizer or plasticizer in admixture with a nitrocellulose is provided in an amount of 5–30% by weight.

13. A pigment composition according to claim 1, wherein the plasticizer or plasticizer in admixture with a nitrocellulose is provided in an amount of 10–25% by weight.

14. A pigment composition according to claim 1, wherein the effect pigment comprises at least one pigment which is a platelet-shaped silicate material having at least one metal oxide or metal oxide hydrate coating or is a platelet-shaped metal oxide or metal, optionally having at least one metal oxide or metal oxide hydrate coating.

15. A pigment composition according to claim 1, wherein the effect pigment comprises at least one pigment which is $TiO_2/Fe_2O_3$ - coated mica or $SO_2$ platelets.

16. A pigment composition according to claim 1, wherein the effect pigment is provided in an amount of at least 60% by weight.

17. A pigment composition according to claim 1, wherein the effect pigment is provided in an amount of more than 80% by weight.

18. A pigment composition according to claim 4, wherein the nitrocellulose has a nitrogen content of 10.9–12.3% by weight.

19. A pigment composition according to claim 1, wherein the plasticizer is a citric ester or tartaric ester.

20. A pigment composition according to claim 1, wherein the composition consists essentially of the one or more effect pigments, the plasticizer and the solvent or solvent mixture.

* * * * *

UNITED STATES PATENT AND TRADEMARK OFFICE
CERTIFICATE OF CORRECTION

PATENT NO. : 6,270,563 B1 Page 1 of 1
DATED : August 7, 2001
INVENTOR(S) : Herget et al.

It is certified that error appears in the above-identified patent and that said Letters Patent is hereby corrected as shown below:

Column 8,
Line 17, change "$SO_2$" to -- $SiO_2$ --.

Signed and Sealed this

Third Day of September, 2002

*Attest:*

*Attesting Officer*

JAMES E. ROGAN
*Director of the United States Patent and Trademark Office*